(12) United States Patent
Fabre

(10) Patent No.: US 8,065,799 B2
(45) Date of Patent: Nov. 29, 2011

(54) METHOD OF FABRICATING A TURBOMACHINE ROTOR DISK

(75) Inventor: Adrien Fabre, Paris (FR)

(73) Assignee: SNECMA, Paris (FR)

( * ) Notice: Subject to any disclaimer, the term of this patent is extended or adjusted under 35 U.S.C. 154(b) by 1197 days.

(21) Appl. No.: 11/750,642

(22) Filed: May 18, 2007

(65) Prior Publication Data

US 2007/0271784 A1    Nov. 29, 2007

(30) Foreign Application Priority Data

May 24, 2006    (FR) ...................................... 06 04739

(51) Int. Cl.
*B21D 39/00* (2006.01)
*B21D 53/78* (2006.01)
*B21K 25/00* (2006.01)
*B23K 35/12* (2006.01)
*B23P 17/00* (2006.01)
*B63H 5/00* (2006.01)
*F03B 3/12* (2006.01)

(52) U.S. Cl. .................. 29/889.2; 29/889.7; 29/889.71; 228/165; 228/245; 416/224; 416/248

(58) Field of Classification Search ................. 29/889.2, 29/889.71, 889.7, 419.1, 423; 419/10, 24; 228/165, 174, 180.5, 193, 234.1, 245, 246; 416/248, 224; 219/121.64

See application file for complete search history.

(56) References Cited

U.S. PATENT DOCUMENTS

| | | | | |
|---|---|---|---|---|
| 4,919,594 A | * | 4/1990 | Wright et al. ................. | 416/230 |
| 5,184,769 A | * | 2/1993 | Moracz et al. ................. | 228/121 |
| 5,745,994 A | * | 5/1998 | Honnorat ...................... | 29/889.2 |
| 7,343,677 B2 | * | 3/2008 | Twigg ........................ | 29/889.71 |
| 7,726,023 B2 | * | 6/2010 | Pursell ....................... | 29/889.23 |
| 2007/0051455 A1 | * | 3/2007 | Franchet et al. ............... | 156/169 |

FOREIGN PATENT DOCUMENTS

| | | | |
|---|---|---|---|
| DE | 10 2004 001 260 A1 | | 8/2005 |
| EP | 0 775 754 A1 | | 5/1997 |
| EP | 1 533 067 A1 | | 5/2005 |
| WO | WO 00/65115 | | 11/2000 |

* cited by examiner

*Primary Examiner* — David Bryant
*Assistant Examiner* — Alexander P Taousakis
(74) *Attorney, Agent, or Firm* — Oblon, Spivak, McClelland, Maier & Neustadt, L.L.P.

(57) ABSTRACT

A method of fabricating a turbomachine rotor disk is disclosed. In the method, a metal container is defined, made up of a plurality of parts that define between them at least one annular cavity, an insert made of composite material is positioned in the at least one cavity, the assembly is subjected to hot isostatic compacting, and a rotor disk is machined.

16 Claims, 3 Drawing Sheets

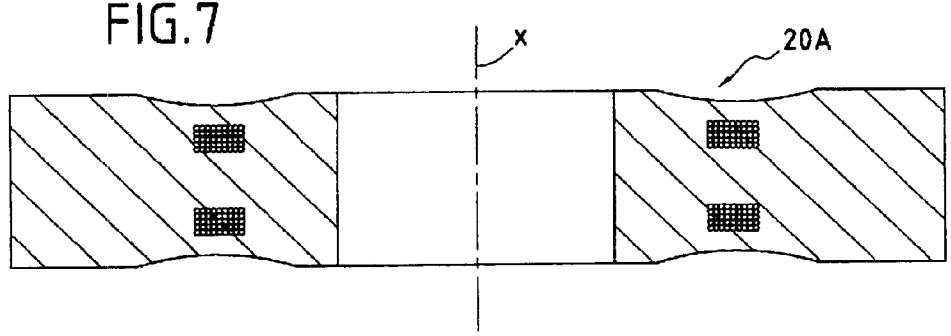
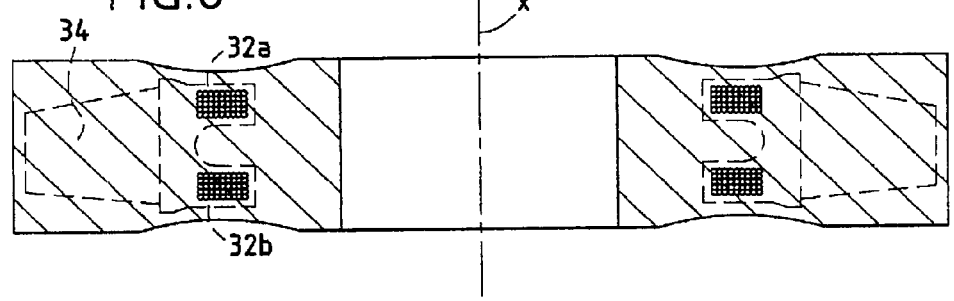
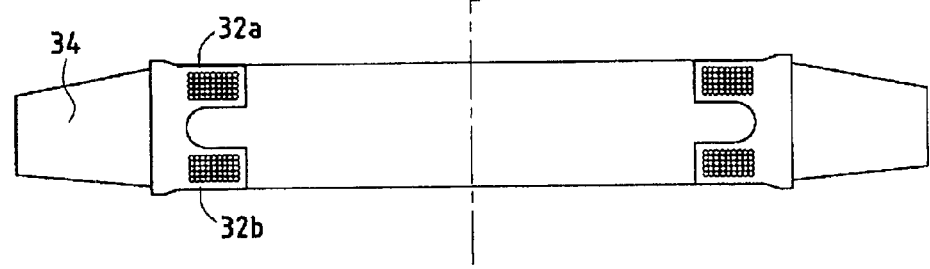
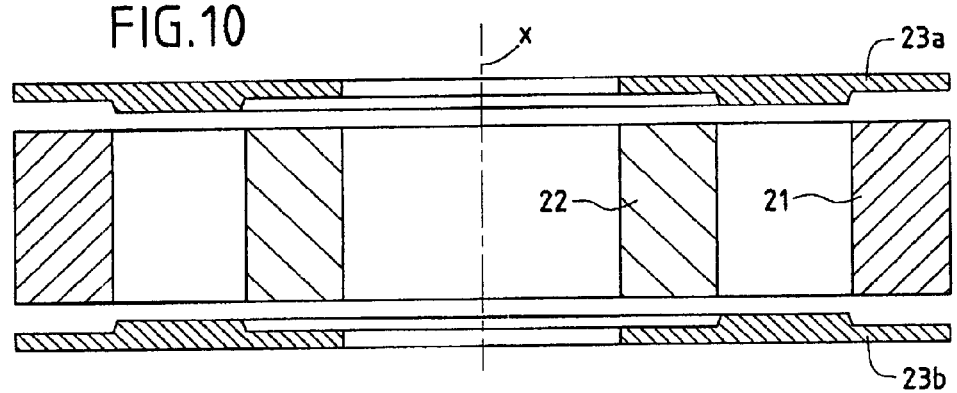

METHOD OF FABRICATING A TURBOMACHINE ROTOR DISK

The invention relates to fabricating a turbomachine rotor disk including, in its structure, at least one annular reinforcing insert of composite material, e.g. a ring of metal-coated ceramic wire, e.g. of titanium-coated silicon carbide. The invention relates more particularly to a method of fabricating such a disk, which can either be adapted to receive blades, or else can be directly bladed integrally, i.e. it can form a one-piece bladed ring known as an integrally-bladed rotor (IBR).

BACKGROUND OF THE INVENTION

U.S. patent publication 2005/0166386 describes a method of fabricating an annular metal matrix reinforced by an annular insert of composite material. In that method, an annular groove is formed in a first annular metal part, a second annular metal part is formed that is suitable for constituting a cover for said groove, composite fiber turns are introduced into the groove, the cover is put into place, and the assembly is subjected to hot isostatic compression.

During that operation, the metal of the cover creeps into the cavity until all of the empty spaces between the turns have been filled.

It is known that such a hot isostatic compression operation is lengthy and expensive.

With the above-described prior method, it is not possible to make a metal matrix including an annular insert of considerable axial length.

In addition, with the prior method, making a drum of IBRs (a part that results from assembling a plurality of disks) assumes that welding is to be performed after each IBR has been individually fabricated. Such an operation carries risks, particularly since each IBR is expensive to make.

The invention enables this problem to be solved.

OBJECTS AND SUMMARY OF THE INVENTION

More particularly, the invention relates to a method of fabricating a turbomachine rotor disk provided with at least one annular reinforcing insert of composite material, the method consisting:

in defining a metal container comprising two coaxial annular blocks, respectively an outer annular block and an inner annular block, together with two annular side plates, said blocs and said side plates defining between them at least one annular cavity;

in positioning a said insert in the or each cavity;

in subjecting the resulting assembly to an operation of hot isostatic compacting, in order to form a one-piece blank; and in machining at least a said rotor disk in said blank.

In the above definition of the method in accordance with the invention, it is possible to integrate at least one insert of relatively great length, the two cover-forming side plates deforming towards each other during the hot isostatic compacting operation.

Most advantageously, the invention also makes it possible in a single hot isostatic compacting operation to make a disk that includes two axially spaced-apart inserts. The advantage of such a disk or IBR having two inserts has been demonstrated for certain applications, in particular for a fan disk.

To this end, the invention also provides a method in accordance with the above definition, wherein the two annular blocks are defined in a single annular block that includes an intermediate portion that is narrower in the axial direction, interconnecting said inner and outer annular blocks so as to form two grooves that are axially spaced apart from each other, said grooves being closed by respective ones of said side plates to define two annular cavities situated on either side of said intermediate portion, each cavity receiving a said insert.

In the two-insert variant, it should be observed that the blank resulting from hot isostatic compacting can also be used for making two disks, each including a single insert. It suffices to cut said blank in two after the hot isostatic compacting operation, and then to proceed with subsequent machining steps on each of the two portions. This serves to halve the time and the expense relating to hot isostatic compacting.

It is also possible to make two bladed disks that are linked together, each including a respective insert.

It is possible optionally to integrate a plurality of said inserts, and in particular more than two inserts, by spacing them apart in a said annular cavity by means of flat metal rings that are suitable, after compacting, for constituting intermediate metal partitions between the inserts, serving to separate said inserts axially.

Starting from the blank, it is possible to make (by machining) a slotted disk that is suitable for receiving blades. It is also possible to machine an IBR in said blank.

BRIEF DESCRIPTION OF THE DRAWINGS

The invention can be better understood and other advantages thereof appear more clearly in the light of the following description of a method in accordance with the principle of the invention, given purely by way of example and made with reference to the accompanying diagrammatic drawings, in which:

FIG. 7 shows the resulting blank;

FIG. 8 shows the machining operations on said blank;

FIG. 9 shows a two-insert two-part IBR obtained after said machining; and

FIG. 10 shows another embodiment of the first annular metal part and the two annular side plates.

MORE DETAILED DESCRIPTION

Figure 1:
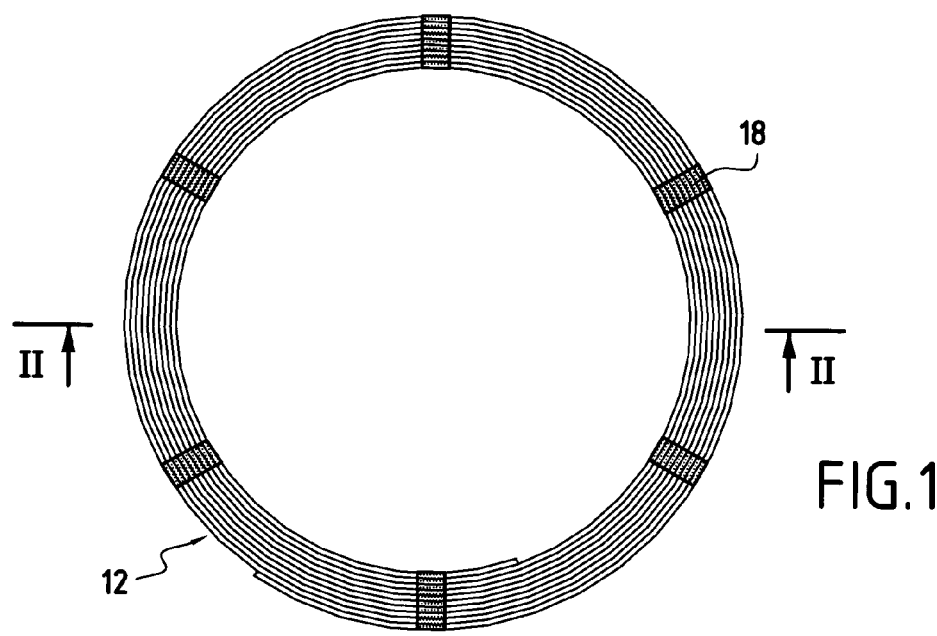
FIG. 1 shows a flat coil used in making a reinforcing insert.
Figure 2:
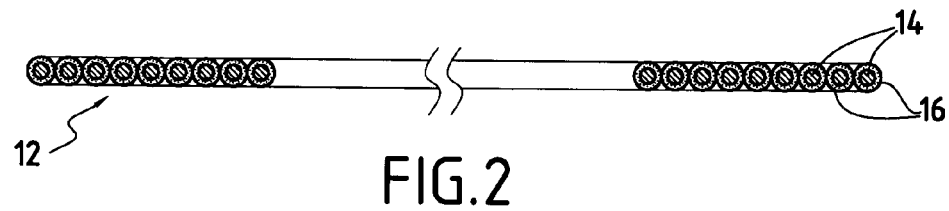
FIG. 2 is a section on II-II of FIG. 1, and on a larger scale.
Figure 3:
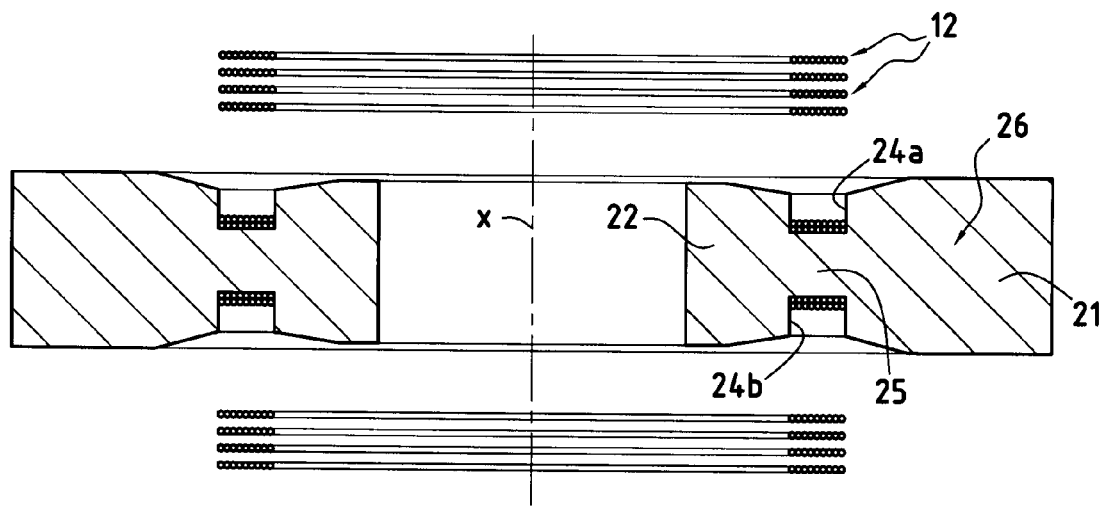
FIG. 3 shows a first annular metal part provided with two grooves in which reinforcing inserts are placed.
Figure 4:
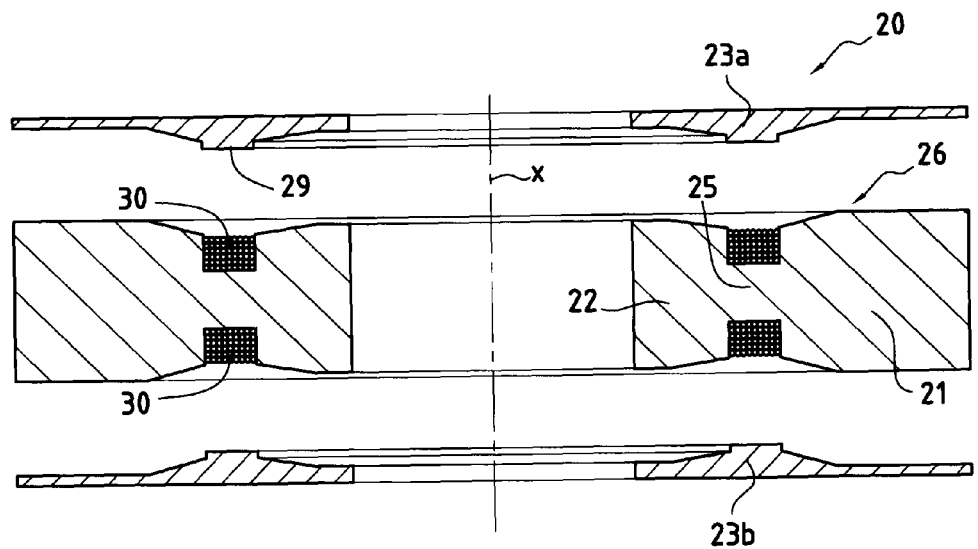
FIG. 4 shows two annular side plates being put into place to form covers.

One of the steps of the method consists in separately fabricating a plurality of flat coils 12. Each coil 12 has one turn per row, radially. It is constituted by a silicon-carbide wire 14 coated in titanium 16. This example is not limiting. It is possible to envisage other types of fiber and other types of coating alloy. Strips of adhesive 18 extending radially serve to stabilize the coil. Nevertheless, the adhesive is removed subsequently. Such flat coils are for being stacked one on another within a metal container 20 shown in FIGS. 3 to 5, in particular. The metal container comprises in particular two coaxial annular blocks 21 and 22 superimposed about an axis x, and two annular side plates 23a, 23b. Said annular blocks and the two side plates define between them at least one annular cavity. In the example shown more particularly, the two coaxial annular blocks 21 and 22 are made in a single annular part 26 (made of titanium) that includes an intermediate portion 25 interconnecting the two coaxial annular blocks 21 and 22. The intermediate portion 25 is axially narrower than are the two annular blocks 21 and 22, thereby defining two grooves 24a and 24b that are spaced apart axially from each other. The grooves 24a and 24b are designed to be closed by the two side plates 23a, 23b, respectively so as to define the two closed annular cavities 28a and 28b that are likewise spaced apart axially.

It should be observed that the intermediate portion 25 need not exist, which would make it possible to define a metal container constituted by two independent coaxial annular blocks 21, 22 that are assembled together by two annular side plates 23a, 23b, as shown in FIG. 10. That would define a single annular cavity of greater axial extent.

The or each cavity 28a, 28b is designed to be filled with a stack of flat coils 12 made in the manner described above. The inside diameter of such a flat coil corresponds to the outside diameter of the inner annular block 22, while its outside diameter corresponds to the inside diameter of the outer annular block 21. In other words, the radial extent of a flat coil corresponds to that of the cavity, and also to the radial extent of the intermediate portion 25 interconnecting the two coaxial annular blocks 21, 22.

The two grooves 24a, 24b open respectively into the two axial faces of the central annular part 26. Slightly sloping annular portions connect the edges of the grooves to the respective plane faces of the central annular part. The two side plates are also made of titanium, but they are of smaller thickness. Nevertheless, they include annular portions of profile substantially complementary to the portions of the central annular part. Each side plate also has a rib 29 of small thickness that is positioned and dimensioned so as to engage into the opening of the corresponding groove 24a, 24b.

The stack of flat coils 12 constitutes an insert 30 that fills each cavity. Naturally, such an insert could be made by forming a coil out of at least one silicon-carbide wire coated in titanium, said coil being dimensioned to occupy substantially all of the space in such a cavity.

With an insert that is made up of a stack of flat coils, the adhesive is eliminated by means of solvent once the flat coils fill the grooves.

Figure 5:
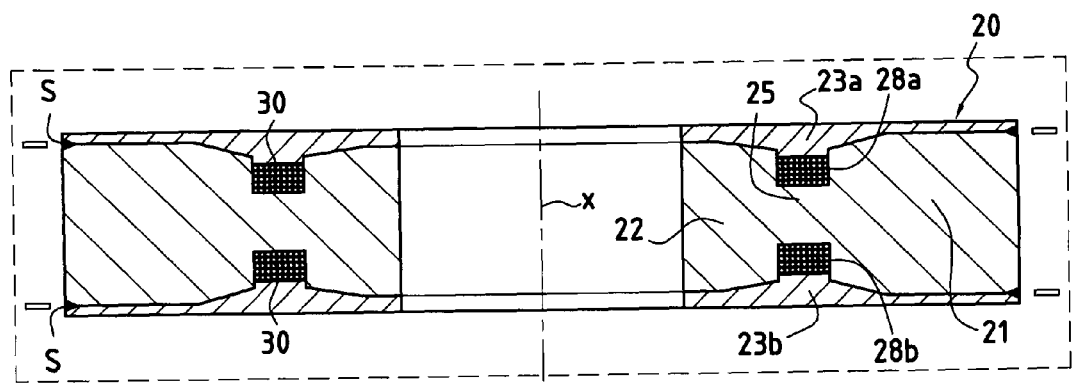
FIG. 5 shows the covers being closed by vacuum welding.
Figure 6:
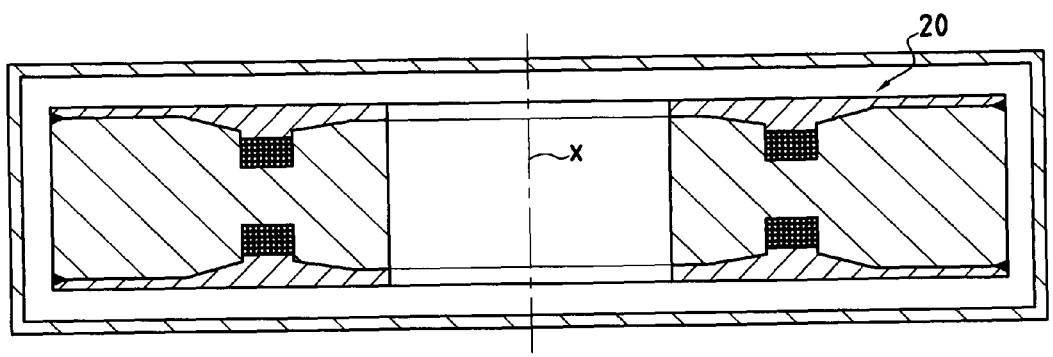
FIG. 6 shows the hot isostatic compacting operation.

In the step shown in FIG. 5, the two side plates 23a, 23b are put into place on either side of the central annular part 26 and the three metal parts are assembled together by making circular peripheral welds between each side plate edge and the corresponding edge of the central annular part. Assembly is performed by welding in a vacuum using an electron beam. Once this step has been completed, a metal container 20 has been defined that is made of titanium and that includes two cavities 28a, 28b about a common axis and offset axially, each cavity being filled with an annular reinforcing insert 30. The following operation, shown in FIG. 6, is hot isostatic compacting. For titanium, the metal container containing the insert is raised to 940° C. under a pressure of 90 megapascals (MPa). During this operation, the titanium of the two side plates, and the titanium coating of the wires, creeps into the cavities 28a, 28b so as to fill in all the empty spaces between the turns. The resulting one-piece blank 20A as shown in FIG. 7 reveals that the side plates become deformed over the two cavities. However the silicon-carbide turns are completely embedded in the metallic mass that has become uniform.

FIG. 8 shows conventional machining operations, known in themselves, that do not need to be described in detail. The purpose of the machining is to define a two-part IBR, i.e. comprising two rings 32a, 32b reinforced by silicon-carbide coils and offset axially (i.e. with material being removed between the two reinforced parts). The blades 34 are likewise integral with the two-part ring. The result is shown in FIG. 9.

As mentioned above, the same process can be used for obtaining two rotor disks, each including one annular reinforcing insert. To obtain two separate disks, it suffices to cut the blank into two equal portions, radially, and to then machine each portion separately in order to define the central disk (containing the insert) and the blades integrally attached to the disk. In order to obtain a drum (an assembly of a plurality of disks) with such IBRs, it suffices to machine them and the ferrule uniting them in the block obtained by the hot isostatic compacting.

Naturally, the invention is not limited to forming an integrally bladed rotor as shown. It can be applied to fabricating a rotor disk (without blades) by machining slots in the periphery thereof for the purpose of receiving independent blades.

The invention also relates to a turbomachine rotor including at least one disk obtained by implementing the method described above, as well as to a turbomachine fitted with such a rotor.

What is claimed is:

1. A method of fabricating a turbomachine rotor disk provided with at least one annular reinforcing insert of composite material, the method comprising:
   providing at least one reinforcing insert of composite material;
   providing metal parts of a container including an outer annular block, an inner annular block and two annular axially spaced side plates, said parts being arranged to define a single annular cavity therebetween;
   positioning said reinforcing insert in the single annular cavity so as to form an assembly;
   subjecting the assembly to an operation of hot isostatic compacting, in order to form a one-piece blank; and
   machining the one-piece blank to form the rotor disk.

2. A method according to claim 1, wherein the two annular blocks are defined in a single annular part that includes an intermediate portion that is narrower than the two annular blocks in the axial direction provided between said inner and outer annular blocks so as to form two grooves that are axially spaced apart from each other, said grooves being closed by said side plates to define two annular cavities situated on either side of said intermediate portion, each cavity receiving said insert.

3. A method according to claim 2, wherein edges of the grooves are connected to faces of the annular part by sloping annular portions.

4. A method according to claim 3, wherein the side plates include a rib which engages the groove, and a portion complementary to the sloping annular portions of the annular part.

5. A method according to claim 1, wherein said insert is made by forming a coil of at least one wire of silicon carbide coated in metal, said coil being dimensioned to occupy substantially all of the space in a said cavity.

6. A method according to claim 1, wherein said insert is made by forming a plurality of flat coils of a wire of silicon carbide coated in metal, each flat coil being shaped to occupy the full radial extent of said cavity, and wherein such flat coils are stacked in the cavity until the cavity is full.

7. A method according to claim 5, wherein said metal coating said silicon-carbide wire is titanium.

8. A method according to claim 1, wherein the machining operation comprises forming a rotor disk including two axially spaced-apart inserts.

9. A method according to claim 1, wherein the machining operation comprises forming two distinct rotor disks, each including said insert.

10. A method according to claim 1, wherein the machining operation comprises forming two linked-together rotor disks, each including said insert.

11. A method according to claim 1, wherein the machining operation comprises forming blades integrally with the disk.

12. A method of fabricating a turbomachine rotor disk, comprising:

providing a metal annular part with an outer annular block, an inner annular block and an intermediate portion which connects the outer annular block and the inner annular block, an axial width of the intermediate portion being less than an axial width of the outer annular block and the inner annular block so as to define a first groove provided on a first axial side of the annular part and a second groove provided on a second axial side of the annular part, the first groove and the second groove being axially spaced apart from each other;

placing at least one annular reinforcing insert of composite material in the first groove and at least one annular reinforcing insert of composite material in the second groove;

placing a first annular side plate on the first axial side of the annular part and a second annular side plate on the second axial side of the annular part so as to form an assembly;

subjecting the assembly to an operation of hot isostatic compacting to form a one-piece blank; and machining the one-piece blank to form the rotor disk.

13. A method as claimed in claim 12, wherein the first side plate is welded to the first side of the annular part and the second side plate is welded to the second side of the annular part prior to the hot isostatic compacting.

14. A method as claimed in claim 12, wherein the insert is a coil, an inner diameter of the flat coil corresponds to an outer diameter of the inner annular block and an outer diameter of the flat coil corresponds to an inner diameter of the outer annular block.

15. A method as claimed in claim 13, wherein the coil includes a silicon-carbide wire coated in titanium.

16. A method as claimed in claim 12, wherein edges of the first groove and a first face of the annular part on the first side of the annular part are connected by annular sloping portions, edges of the second groove and a second face of the annular part on the second side of the annular part are connected by annular sloping portions, the first side plate includes annular portions of profile substantially complementary to portions of the first side of the annular part and the second side plate includes annular portions of profile substantially complementary to portions of the second side of the annular part.

* * * * *